United States Patent [19]
Yoshida et al.

[11] Patent Number: 4,608,676
[45] Date of Patent: Aug. 26, 1986

[54] APPARATUS FOR OPTICALLY REPRODUCING AN INFORMATION SIGNAL FROM A RECORD DISK

[75] Inventors: Tadao Yoshida, Kawasaki; Yoshiaki Haneda, Tokyo, both of Japan

[73] Assignee: Sony Corporation, Tokyo, Japan

[21] Appl. No.: 715,780

[22] Filed: Mar. 26, 1985

Related U.S. Application Data

[63] Continuation of Ser. No. 382,298, May 26, 1982, abandoned.

[30] Foreign Application Priority Data

May 28, 1981 [JP] Japan .................................. 56-81532

[51] Int. Cl.$^4$ ............................................ G11B 21/08
[52] U.S. Cl. ..................................... 369/32; 369/111; 360/72.2
[58] Field of Search .................... 369/32, 30, 33, 111; 360/72.2, 75, 78; 365/234

[56] References Cited

U.S. PATENT DOCUMENTS

| | | | |
|---|---|---|---|
| 4,106,058 | 8/1978 | Pomeas | 360/78 |
| 4,138,663 | 2/1979 | Lehureau et al. | 369/44 |
| 4,223,349 | 9/1980 | Dakin | 369/50 |
| 4,228,326 | 10/1980 | Dakin | 369/111 |
| 4,321,635 | 3/1982 | Tsuyuguchi | 360/72.2 |
| 4,338,683 | 7/1982 | Furukawa | 369/50 |
| 4,375,091 | 2/1983 | Dakin | 369/32 |

OTHER PUBLICATIONS

*Mathematical Snapshots*, ©1969 by Steinhous, p. 57.

Primary Examiner—Alan Faber
Attorney, Agent, or Firm—Lewis H. Eslinger; Alvin Sinderbrand

[57] ABSTRACT

A method of moving a pick-up device of an optical reproducing apparatus to a position corresponding to a desired address of a record disk, the record disk having an information signal and an address signal recorded in an information area thereon, comprising the steps of producing a desired address signal corresponding to the desired address; partitioning the information area into radially partitioned information sections; moving the pick-up device to a position between two adjacent radially partitioned information sections at a speed faster than normal reproducing speed; reproducing the address signal at the last position of the pick-up device; comparing the reproduced address signal at the last position with the desired address signal; further moving the pick-up device in a direction and an amount determined by the comparing step to a position between two adjacent radially partitioned information sections and within one of the radially partitioned information sections between which the pick-up device was last positioned at a speed faster than the normal reproducing speed; and repeating the steps of reproducing, comparing and further moving until the pick-up device is moved to the position corresponding to the desired address. Apparatus for performing the above method is also provided.

6 Claims, 9 Drawing Figures

FIG. 6 (PRIOR ART)

| | | |
|---|---|---|
| 1st Frame | SP "0" | Audio Information |
| 2nd Frame | SP "1" | Audio Information |
| 3rd Frame | SP PQRSTUVW | Audio Information |
| | SP | Audio Information |
| ------ | | |
| 98th Frame | SP | Audio Information |

FIG. 7 (PRIOR ART)

| Display (8 Bits) | Music Number (8 Bits) | Index (8 Bits) | Time (20 Bits) | "0" (36 Bits) | Correction (16 Bits) |
|---|---|---|---|---|---|

"0" "1"

APPARATUS FOR OPTICALLY REPRODUCING AN INFORMATION SIGNAL FROM A RECORD DISK

This is a continuation of application Ser. No. 06/382,298, filed May 26, 1982 now abandoned.

BACKGROUND OF THE INVENTION

1. Field of the Invention

This invention relates generally to optical reproducing apparatus and, more particularly, is directed to apparatus for optically reproducing audio information from a record disk.

2. Description of the Prior Art

Apparatus is known in the art for optically reproducing an information signal from a record disk during rotation of the latter. With such apparatus, a pick-up device is positioned below the record disk and projects a laser beam onto the disk. The laser beam is modulated by, for example, audio information recorded on the disk and the modulated laser beam is reflected from the underside of the disk back to the pick-up device which produces an output signal in response to the modulated laser beam and which supplies such signal to further processing circuitry for removing the audio information therefrom.

In one such apparatus, it has been proposed to detect address information also recorded on the record disk for performing a search or cueing operation so that reproduction at a desired point can be easily and quickly achieved. With such apparatus, the pick-up device is moved at a speed faster than the normal reproduction speed, while the record disk is rotated at the normal reproduction speed. Accordingly, normal reproduced sound is produced at the output of the apparatus, and address information is detected to perform the cueing operation for obtaining a desired address. Generally, the pick-up device includes a tracking servo system for causing the pick-up device to accurately trace the correct track and a focusing servo system for focusing the laser beam through an objective lens onto and from the record disk. It is to be appreciated that, as the pick-up device is moved radially of the record disk by the tracking servo system, the focusing of the laser beam onto and from the disk changes. Accordingly, during such faster radial movement of the pick-up device, the objective lens thereof is moved from a first position toward a second position to maintain the focus of the laser beam onto the record disk. When the objective lens reaches a critical or limit point at the second position, it is skipped or jumped back to the first position to maintain the focus of the laser beam. In this manner, only a portion of the information, both audio and address, are detected.

Thus, during the cueing or search operation, the pick-up device reproduces audio and address information from a portion of the record disk, skips over a portion and repeats the cycle. The address information reproduced by the pick-up device is compared with desired address information to control the tracking servo system so that the pick-up device is moved to the desired address point. However, with such apparatus, the maximum time required for the cueing or search operation becomes relatively long, for example, of the order of 13.25 seconds and the mean search time is approximately one-half of this time.

OBJECTS AND SUMMARY OF THE INVENTION

Accordingly, it is an object of this invention to provide a method and apparatus for optically reproducing an information signal from a record disk that avoids the above-described difficulties encountered with the prior art.

More particularly, it is an object of this invention to provide a method and apparatus for optically reproducing an information signal from a record disk and which is adapted to perform a cueing or search operation in a relatively short period of time.

In accordance with an aspect of this invention, a method is provided for moving pick-up means of an optical reproducing apparatus to a position corresponding to a desired address of a record disk, the record disk having an information signal and an address signal recorded in an information area thereon, including the steps of producing a desired address signal corresponding to the desired address; positioning the information area into radially partitioned information sections; moving the pick-up means to a position between two adjacent radially partitioned information sections at a speed faster than normal reproducing speed; reproducing the address signal at the last position of the pick-up means; comparing the reproduced address signal at the last position with the desired address signal; further moving the pick-up means in a direction and an amount determined by the comparing step to a position between two adjacent radially positioned information sections between which the pick-up means was last positioned at a speed faster than the normal reproducing speed; and repeating the steps of reproducing, comparing and further moving until the pick-up means is moved to the position corresponding to the desired address.

In accordance with another aspect of this invention, apparatus is provided for optically reproducing an information signal from an information area on a record disk, the information area also including an address signal recorded therein, the apparatus including pick-up means for reproducing the information signal and the address signal from the information area; drive means for moving the pick-up means in the radial direction of the record disk; address setting means for producing a desired address signal corresponding to a desired address of the record disk; and processing means for partitioning the information area into radially partitioned information sections; for controlling the drive means to move the pick-up means at a speed faster than normal reproducing speed to a position between two adjacent radially partitioned sections, for comparing the address signal reproduced by the pick-up means at the last position with the desired address signal, and for thereafter controlling the drive means to continuously control the direction and amount of movement of the pick-up means at a speed faster than the normal reproducing speed to successive positions between two adjacent radially partitioned information sections, each of the latter positions being within one of the radially partitioned information sections between which the pick-up means was last positioned, until the pick-up means is moved to a position corresponding to the desired address.

The above, and other, objects, features and advantages of the invention will become apparent from the following detailed description of an illustrative embodiment thereof which is to be read in connection with the accompanying drawings.

BRIEF DESCRIPTION OF THE DRAWINGS

FIGS. 4-7 are schematic diagrams used to explain the arrangement of a digital information signal recorded on the record disk of FIG. 1;

DETAILED DESCRIPTION OF A PREFERRED EMBODIMENT

Figure 1:
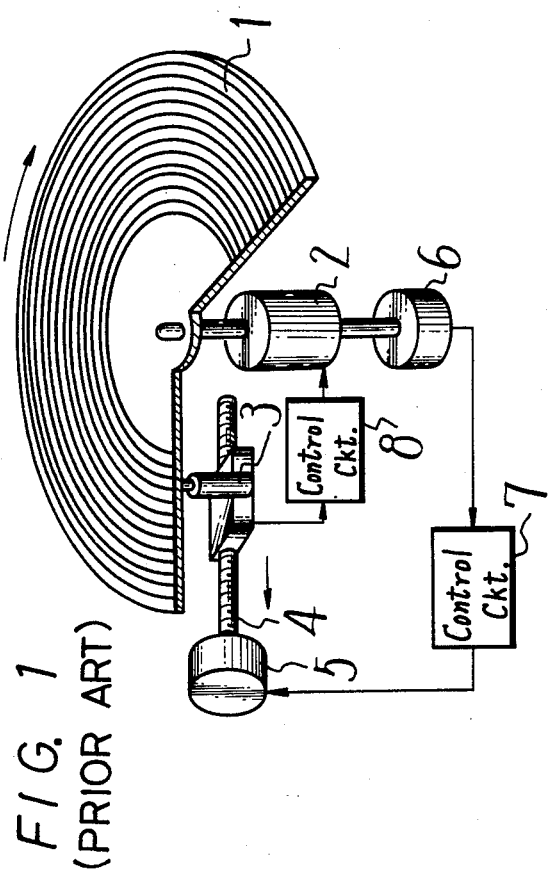
FIG. 1 is a schematic perspective view of a prior art apparatus for optically reproducing an information signal from a record disk.

Referring to the drawings in detail, and initially to FIG. 1 thereof, apparatus for optically reproducing an information signal, such as a digital audio signal, from a record disk 1 includes a spindle motor 2 for rotating record disk 1 in the counter-clockwise direction, as viewed in FIG. 1 from the underside of record disk 1. A pick-up device 3 is positioned below record disk 1 and is linearly moved in the radial direction of record disk 1 by a feed mechanism comprised of a worm gear 4 and a motor 5 from the inner periphery of record disk 1 to the outer periphery thereof in correspondence with rotation of record disk 1. In this regard, a detector 6 detects the rotation of spindle motor 2 and produces a detection signal in response thereto which is supplied to a control circuit 7 for controlling the rotation of motor 5 by a predetermined amount relative to the rotation of record disk 1. Also, a second control circuit 8 produces a signal indicating the radial position of pick-up device 3 and supplies such signal to spindle motor 2 to control the latter to rotate record disk 1 at a constant linear velocity.

Figure 2:
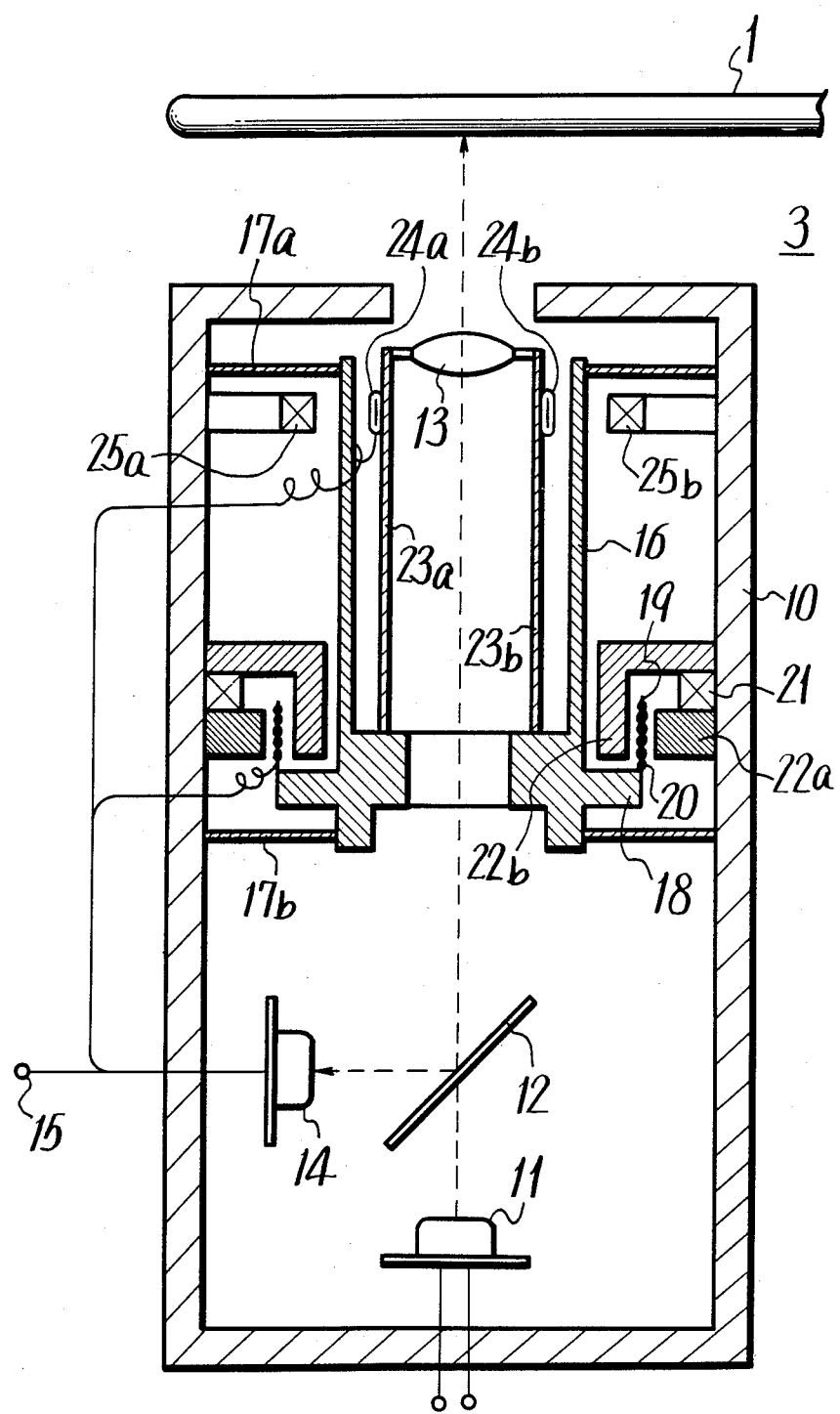
FIG. 2 is a schematic, enlarged, cross-sectional view of the pick-up device used in the apparatus of FIG. 1.

Referring now to FIG. 2, a pick-up device 3 that can be used with the apparatus of FIG. 1 includes an outer casing 10 containing therein a laser light source 11 which may be, for example, a semiconductor laser. A laser light beam emitted from laser light source 11 is supplied through a beam splitter 12 to an objective lens 13 which focuses the light beam as a spot on the surface at the underside of record disk 1. The undersurface of record disk 1, is formed with a series of pits and bumps in a spiral track or in concentric tracks, and such surface is also formed as a mirror surface for reflecting a light beam irradiated thereon. Accordingly, the light beam focused by objective lens 13 is modulated by the pits and bumps on record disk 1, and then, the modulated light beam is reflected from the undersurface of record disk 1 through objective lens 13 to beam splitter 12 which reflects the modulated light beam to a photo-detector 14. Photo-detector 14, in response thereto, supplies an output signal to output terminal 15 and then to a processing circuit for the reproduced signal. It is to be appreciated that photo-detector 14 includes tracking control and focusing control servo systems for correctly receiving the modulated light beam reflected by beam splitter 12.

In order to correctly focus the light beam onto record disk 1, objective lens 13 is moveable in the horizontal and vertical directions of FIG. 2. In particular, a hollow mirror cylinder is vertically positioned within casing 10 and is connected at its upper and lower ends to casing 10 by springs 17a and 17b, respectively, which permit movement of mirror cylinder 16 in the vertical direction of FIG. 2. The lower end of mirror cylinder 16 is provided with a radial flange 18 having a cylindrical bobbin 19 mounted thereon concentrically with mirror cylinder 16, the periphery of bobbin 19 having a focusing servo coil 20 wound thereabout. In addition, a magnet 21 is secured to the inner wall of casing 10 and the opposite poles of magnet 21 are connected to first ends of first and second yokes 22a and 22b formed of a magnetic material and also secured to the inner wall of casing 10. The other ends of yokes 22a and 22b extend from outer wall 10 so as to surround coil 20. In particular, yoke 22a is extended radially outside of coil 20 and yoke 22b is extended radially inside of yoke 20. Accordingly, mirror cylinder 16 is moved vertically in FIG. 2 in response to the magnitude of current flowing to focusing servo coil 20. In this manner, when a focusing servo control current is supplied to focusing servo coil 20, the light beam from light source 11 is focused by objective lens 13 onto record disk 1.

For controlling movement of objective lens 13 in the horizontal direction of FIG. 2, two parallel and vertical plate or leaf springs 23a and 23b extend from the lower end of mirror cylinder 16 to the upper end thereof, with objective lens 13 being mounted at the upper ends of leaf springs 23a and 23b. Tracking servo coils 24a and 24b which are wound in the vertical direction are secured near the upper ends of leaf springs 23a and 23b, respectively, and magnets 25a and 25b are secured to the inner wall of casing 10 at positions opposing coils 24a and 24b. Accordingly, leaf springs 23a and 23b are moved in the horizontal direction of FIG. 2, the amount and direction of such movement depending on the magnitude of current flowing through coils 24a and 24b. In this manner, a tracking servo operation can be performed in which the pits and bumps on record disk 1 to be scanned are coincident with the optical axis of objective lens 13.

Figure 3:
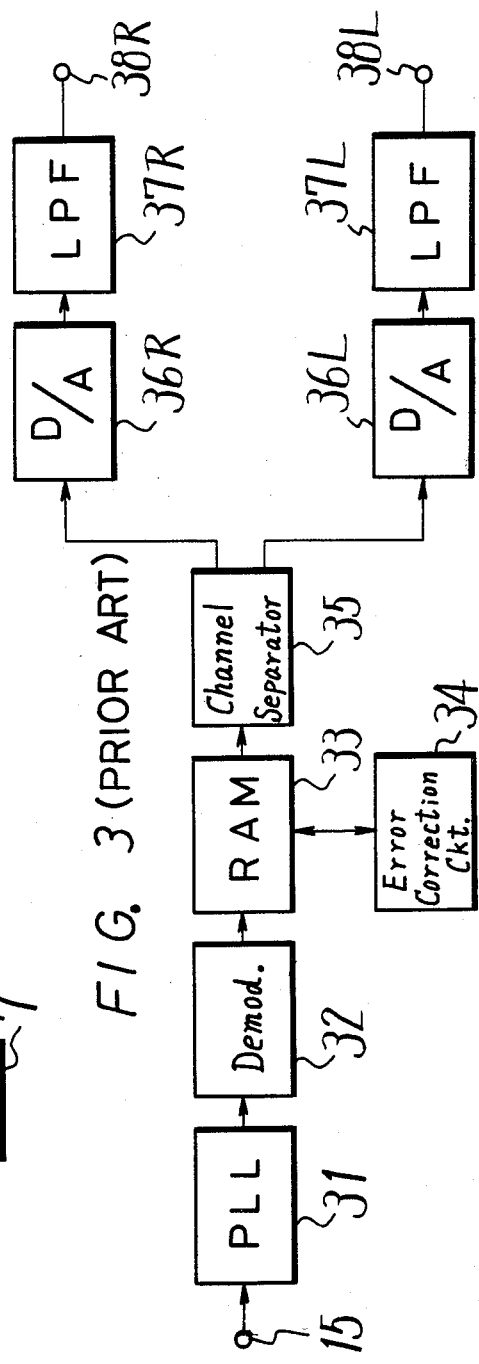
FIG. 3 is a block diagram of a prior art processing circuit for processing the information signal reproduced by the pick-up device of FIG. 2.
Figure 4:
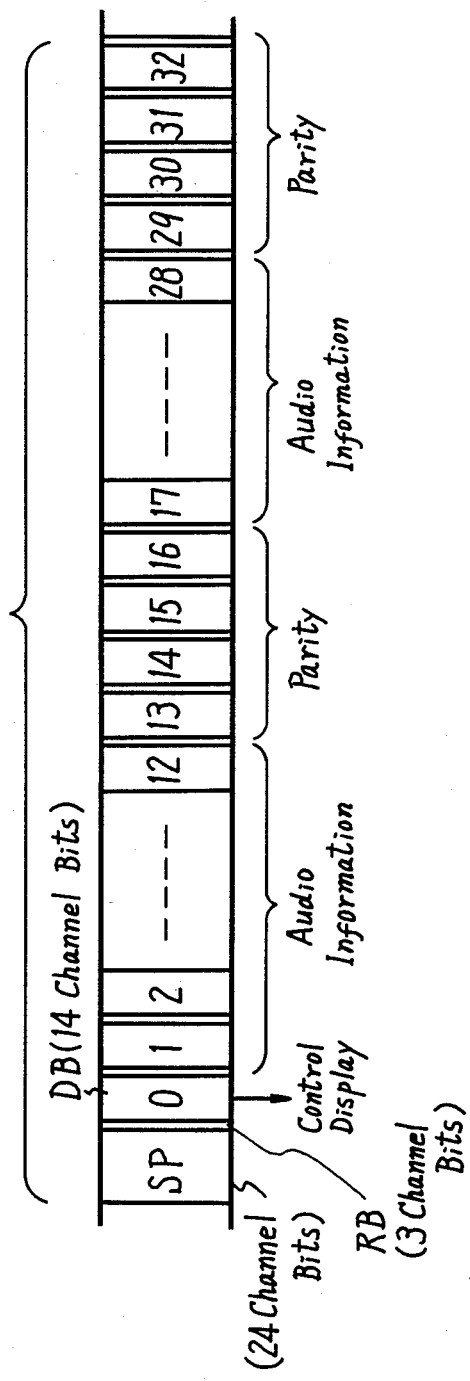
Figure 5:
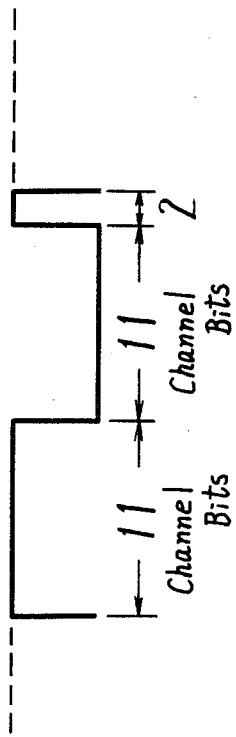

Referring now to FIG. 3, a processing circuit for processing the information signal reproduced by pick-up device 3 includes a phase locked loop (PLL) 31 supplied with the information signal from terminal 15 and which functions to remove phase fluctuation components from the reproduced information signal. The output signal from PLL circuit 31 is supplied to a demodulator 32 which demodulates the signal from PLL circuit 31 to produce an output digital information signal, which is preferably constructed with the bit pattern illustrated in FIG. 4 for each frame of information. In particular, a 24 channel-bit synchronizing pattern SP is provided at the beginning or head of each frame and is comprised, for example, of an 11 channel-bit high electric potential interval, followed by an 11 channel-bit low electric potential interval, and followed by a 2 channel-bit high electric potential interval, as shown in FIG. 5. A 3 channel-bit DC fluctuation suppressing redundant bit pattern RB is provided following synchronizing pattern SP, followed by 33 sets (0~32) of 14 channel-bit data bit patterns DB, each data bit pattern DB, being followed by a redundant bit pattern RB, as aforementioned. It is to be noted that the digital information signal is converted in an 8-to-14 conversion process, such that each of the data bit patterns DB represents data of 8 bits. The 0th data bit pattern DB is used as a control and display signal, each of the 1st to 12th and 17th to 28th data bit patterns DB is used as part of the audio information signal, and each of the 13th to 16th and 29th to 32th data bit patterns DB is used as a parity signal. In this manner, one frame of the digital signal is formed of 588 channel bits.

The digital signal produced by demodulator 32 is then supplied to a random access memory (RAM) 33 and stored therein. The stored signal is converted in a 14-to-8 conversion process and error corrected in an error correction circuit 34, and the converted and error corrected signal from RAM 33 is supplied to a channel separation circuit 35 which separates the signal from RAM 33 into left-channel and right-channel signals. The separated signals are supplied to digital-to-analog (D/A) conversion circuits 36R and 36L in the right-channel and left-channel, respectively, and the digital-to-analog converted signals therefrom are supplied through low-pass filters 37R and 37L to output terminals 38R and 38L, respectively.

Referring to FIGS. 4–7, it is to be recalled that the 0th data bit pattern DB for each frame is used as a control and display signal. Accordingly, 98 data bit patterns DB from each succession of 98 successive frames are formed into a unit, with 8 bits of information being contained in the 0th data bit pattern DB for each frame. Only one of the 8 bits of each of the 98 0th data bit patterns DB formed into the unit is used for the address information recorded on record disk 1. In particular, as shown in FIG. 6, when 98 successive frames are rearranged in parallel with each other, with each 0th data bit pattern DB being formed of 8 bits P, Q, ... W, the vertical column of 98 Q-bits can be used for the address information. The 98 Q-bits of address information can be arranged, as shown in FIG. 7, comprised of, in sequence, a first "0" synchronizing bit, a second "1" synchronizing bit; 8 display bits indicating the content of the following signals; 8 music number bits indicating the sequential order of the music from 00 to 99; 8 index bits indicating the sequential order of individual intervals formed by equally dividing or partitioning a musical arrangement into 100 intervals or partitions; 20 time bits indicating the playing time of a musical arrangement from the beginning to end thereof by minutes (2 figures), seconds (2 figures) and 1/10 seconds (1 figure); a "0" bit interval of 36 bits; and 16 error correction bits. The 98-bit address information is detected once during each playback of 98 frames which may occur, for example, every 13.3 msec. In accordance with this address information, the number of the musical arrangement being played, the amount of playing time and the like can be indicated.

It is to be appreciated that, with record disk 1, a large amount of information can be recorded on one surface thereof, for example, approximately 60 minutes of playback time. However, it may be desirable to reproduce only a portion of the information or music recorded on record disk 1. For example, it may be desirable to begin reproduction at a midway point of the record disk. In this regard, it has been proposed to move pick-up device 3 at a speed faster than the normal reproducing speed and use the reproduced address information to perform a cueing or search operation for a desired address.

Figure 8:
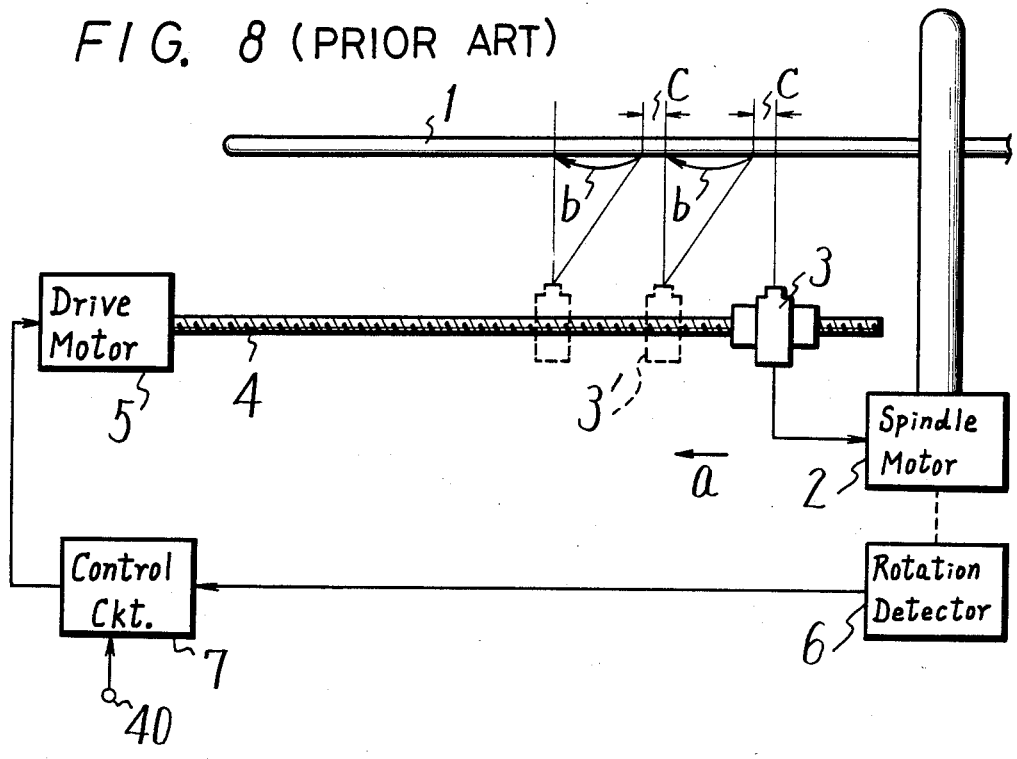
FIG. 8 is a schematic plan view used to explain the operation of the pick-up device in the apparatus of FIG. 1.

With such cueing operation, drive motor 5 drives or moves pick-up device 3 in the direction of arrow a in FIG. 8 at a speed faster than that during normal playback operation, while spindle motor 2 rotates disk 1 at the normal playback speed. At such time, the tracking and focusing servo systems for objective lens 13 move or focus objective lens 13 so that pick-up device 3 reproduces the information signal recorded by the series of information pits and bumps in the area or section c thereon. Since pick-up device 3 is moved in the radial direction of record disk 1 at a speed faster than the normal reproducing speed, the tracking servo system for objective lens 13 reaches a critical or limit point, for example, at the position indicated by broken line 3' in FIG. 8. Accordingly, at such time, the tracking servo system of pick-up device 3 causes objective lens 13 to skip or jump over an area on record disk 1, indicated by arrow b in FIG. 8, to again permit tracking of record disk 1 by pick-up device 3. In such case, only the information in area or section c on the record disk is reproduced as a substantially normal reproduced signal at output terminal 15 of pick-up device 3, and the area or section traversed by arrow b is skipped and not reproduced. In this manner, the information signal is reproduced for intermittent portions of record disk 1.

During the aforementioned cueing or search operation, the reproduced address information is compared with desired address information to move pick-up device 3 to a desired address. Thus, when pick-up device 3 passes over the desired address, that is, by skipping or jumping thereover in accordance with arrow b in FIG. 8, drive motor 5 is rotated in the reverse direction at normal playback speed and the address information of each of the 98 frames of a unit is detected to find the beginning or start of the desired address and to move pick-up device 3 thereto. However, with such cueing operation, the maximum time $T_{max}$ required for the cueing operation is calculated as follows:

$$T_{max} = T_J\left(\frac{N_T}{N_J} + \frac{N_J}{2}\right), \quad (1)$$

where $T_J$ represents the total time required for one skipping and one data detection operation, that is, the time required to reproduce the information from an area or section c and the time required for the skipping operation determined by arrow b, $N_J$ represents the number of tracks skipped during each skipping or jump operation and $N_T$ represents the entire number of tracks on the record disk. Thus, for example, given that $T_J$ is 53 msec., $N_J$ is approximately equal to 100 in view of the time resolution to be achieved, and $N_T$ is 20,000, $T_{max}$ can be calculated as follows:

$$T_{max} = 53\left(\frac{20,000}{100} + \frac{100}{2}\right) \times 10^{-3} = 13.25 \text{ sec.} \quad (2)$$

if the mean value for a cueing operation is represented, for example, as $T_{max}/2$, each cueing operation takes approximately 6.5 sec. In other words, with the aforementioned apparatus, to carry out a cueing operation with respect to a desired address, it takes an average time of 6.5 seconds and a maximum time of more than 13 seconds to begin reproducing a desired information signal. It is to be appreciated that this time is relatively long.

Accordingly, referring to FIG. 9, apparatus for optically reproducing an information signal from record disk 1 according to one embodiment of this invention will now be described, in which elements corresponding to those previously described in relation to the prior art apparatus of FIGS. 1-8 is identified by the same reference numerals and a detailed description thereof will be omitted herein for the sake of brevity. In particular, the reproduced signal from pick-up device 3 is supplied through a decoder 41 comprised of code conversion and error correction circuits and the output signal therefrom is supplied to a pulse code modulation (PCM) demodulator 42 comprised of D/A converters and the like. The output signal from demodulator 42 is supplied to an output terminal 38 as the demodulated audio information signal.

In addition, the address information portion of the reproduced signal from decoder 41 is supplied to a central processing unit (CPU) 45, the operation of which will be described hereinafter. In addition, CPU 45 is supplied with a signal from pick-up device 3 for indicating the playback position of pick-up device 3, and with a signal from a desired address setting circuit 44 corresponding to a desired address for the start of reproduction. In response to these signals, CPU 45 supplies a signal to drive motor 5 for controlling the radial movement of pick-up device 3 and a signal to a servo circuit 43 which, in response thereto, and in response to the reproduced signal from pick-up device 3, controls the focusing and tracking servo operations of pick-up device 3.

Figure 9:
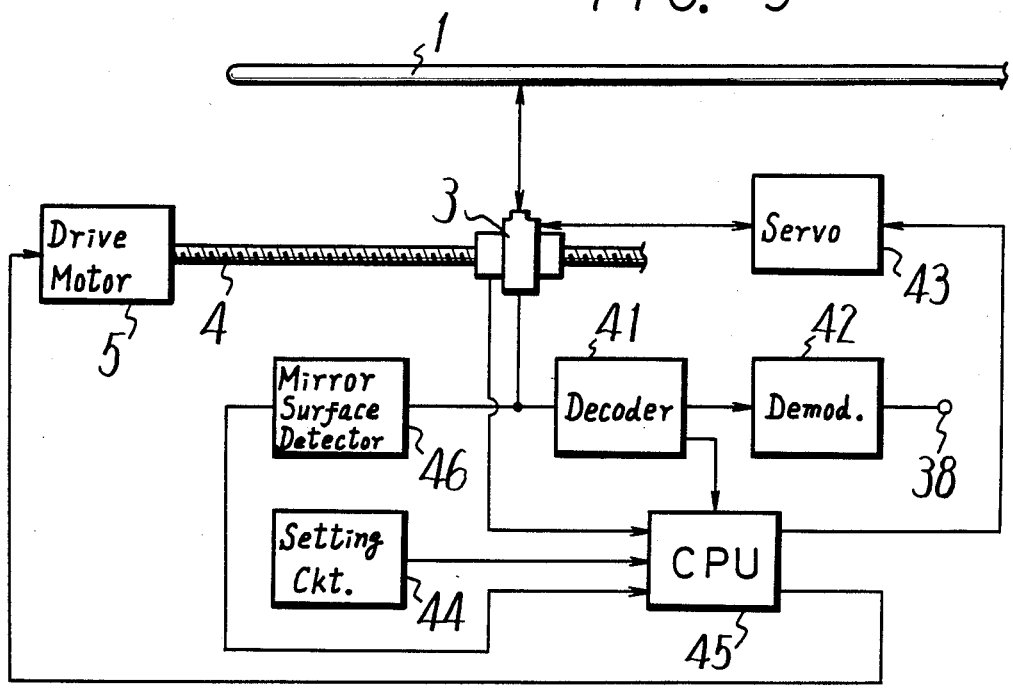
FIG. 9 is a schematic, block diagram of an apparatus for optically reproducing an information signal from a record disk according to one embodiment of this invention.

In accordance with the operation of the apparatus of FIG. 9 according to the present invention, when a desired address is designated by setting circuit 44, drive motor 5 is controlled by CPU 45 to rotate at a high speed and therefore move pick-up device 3 in the radial direction of record disk 1 at a high speed. In accordance with the address information reproduced by pick-up device 3, CPU 45 controls drive motor 5 to move pick-up device 3 to a radial position on record disk 1 corresponding to a point where the information area on record disk 1 is divided or partitioned into two sections, that is, to a midway point of the information area on record disk 1, measured by the radial length along the disk. The address information signal reproduced by pick-up device 3 at this position is detected and compared with the desired address information signal from setting circuit 44. When the desired address information signal is greater than the address information signal reproduced by pick-up device 3, CPU 45 controls drive motor 5 to move pick-up device 3 in the positive or forward direction. On the other hand, when the desired address information signal is smaller than the address information signal reproduced by pick-up device 3, CPU 45 controls drive motor 5 to move pick-up device 3 in the negative or reverse direction. In particular, it is to be appreciated that pick-up device 3 is at a half-way position on record disk 1. Accordingly, after such comparison operation has occurred, pick-up device 3 is moved to a position on record disk 1 in which the one-half information area to the right or left of the midway point is further radially divided or partitioned in half, that is, where the information area is divided radially into four sections. In other words, once the first comparison operation occurs, pick-up device 3 is moved to the right or left to a half-way point of one of the already divided one-half areas, that is, to a position where the information area on record disk 1 is divided into four sections. Upon subsequent comparison operations between the address information signal reproduced by pick-up device 3 and the desired address information signal from setting circuit 44, pick-up device 3 is continuously moved to positions where the information recorded on record disk 1 is divided into 8, 16 and so on sections to carry out the cueing operation until the desired address position is achieved.

With the apparatus according to the present invention, the access time $T_a$ for achieving a cueing operation is calculated as follows:

$$T_a = T_J(INT \log_2 N_T + 1) \qquad (3),$$

where INT represents the operation of taking the integer value of $\log_2 N_T$. Thus, as in the case of the prior art apparatus, if $T_J$ is equal to 53 msec. and $N_T$ is equal to 20,000, the access time $T_a$ for the cueing operation with the present operation is equal to 53(14+1) msec. or 795 msec. In this manner, the cueing operation with the present invention occurs approximately eight to ten times faster than that with the prior art for achieving a desired address. It is to be appreciated that, because the desired address is achieved by always halving an area, the same number of halving steps is generally required for each search operation so that the access time $T_a$ is substantially always constant, regardless of the address to be searched.

In order to detect the playback position of pick-up device 3 with the present invention, it is possible to use a slide volume arrangement provided in ganged relation with pick-up device 3 to analog-to-digital convert the output voltage from the latter, and to use a range finder, such as a linear encoder. In apparatus where movement of pick-up device 3 is based upon a system which spirally scans the disk, taking one point as its center, it may be possible to use a rotary encoder. In addition, the playback position of pick-up device 3 may be determined by the peak value of the tracking error signal.

It is to be appreciated that, in the case where pick-up device 3 is moved to a position where no information is recorded, for example, at the outer periphery of record disk 1, the laser light beam is not modulated by any information, and accordingly, errors will result with the apparatus of FIG. 9. In order to avoid this problem, the reproduced signal from pick-up device 3 is supplied to a mirror surface detection circuit 46 for detecting when pick-up device 3 has moved to a position relative to record disk 1 where no information is recorded. In particular, when no pits or bumps are present on record disk 1, the laser light beam is not modulated thereby, and accordingly, a continuous high level signal is produced at output terminal 15 of photo-detector 14 of pick-up device 3. Accordingly, when mirror surface detection circuit 46 detects that no information is recorded on record disk 1, an output signal from mirror surface detection circuit 46 is supplied to CPU 45, whereby the latter controls drive motor 5 to move pick-up device 3 to a radial position one-quarter of the radial length from the inner periphery to the outer periphery of record disk 1. The detected address information signal at this latter point is compared with the desired address information signal to again perform the cueing operation in accordance with the present invention. If no address information is detected at this point, for example, where information is not recorded on record disk 1 thereat, the output signal from mirror surface detection 46 is supplied to CPU 45, whereby the latter controls drive motor 5 to move pick-up device to an inner peripheral portion of record disk 1 which is divided into 8 sections, that is, by halving the area from the former point to the inner periphery of record disk 1, whereupon the cueing operation is again resumed.

Further, with the present invention, when the difference between the desired address information signal and the address information signal reproduced by pick-up device 3 is reduced below a predetermined value, pick-up device 3 can be driven to skip or jump tracks on record disk 1 one by one. If pick-up device 3 is so operated, it becomes unnecessary to raise or enhance the detection precision of pick-up device 3 for detecting the divided or partitioned positions.

It is to be appreciated that various modifications can be made with the present invention. For example, it is possible to first partition the information area into 20 first sections to detect the address information at every 1000 tracks, to next partition or divide each of the 20 first sections into 10 second sections to detect the address information at every 100 tracks, and next to partition or divide each of the latter 10 second sections into 10 third sections to detect the address information at every 10 tracks. Thereafter the address information is detected for each track. In accordance with the above apparatus, it is possible to greatly reduce or shorten the access time over that achieved with the prior art. In this manner, pick-up device 3 can successively be moved to positions between successive adjacent ones of the first sections until the reproduced address information signal is greater than the desired address information signal. Thereafter, pick-up device 3 is successively moved in the reverse direction to positions between successive adjacent ones of the second sections until the reproduced address information signal is less than the desired address information signal. Thereafter, the direction of movement of pick-up device 3 is again reversed to successively move the latter to positions between successive adjacent ones of the third sections until the reproduced address information signal is greater than the desired address information signal. The direction of pick-up device 3 is then again reversed and pick-up device 3 thereafter scans each track in the respective third section until pick-up device 3 is moved to a position corresponding to the desired position.

Having described a specific preferred embodiment of the invention, it is to be understood that the present invention is not limited to that precise embodiment, and that various changes and modifications may be effected therein by one skilled in the art without departing from the scope or spirit of the invention, as defined in the appended claims herein.

What is claimed is:

1. A method of moving pick-up means of an optical reproducing apparatus to a position corresponding to a desired address of a record disk wherein said record disk is rotated at a constant linear velocity with respect to said pick-up means, said record disk having information and address signals recorded in an information area thereon, comprising the steps of:

producing a desired address signal corresponding to said desired address;

generating address signals by the steps of at least generating address signal for radially partitioning said information area into two radially equal successive first subdivisions, partitioning each of said radially successive first subdivisions into two radially equal successive second subdivisions, and partitioning each of said radially successive second subdivisions into two radially equal successive third subdivisions;

moving said pick-up means to a first intermediate position between an adjacent two of said radially successive first subdivisions at a speed faster than normal reproducing speed;

reproducing the address signal at said first intermediate position of said pick-up means between said adjacent two first subdivisions;

comparing said address signal reproduced at said first intermediate position with said desired address signal;

further moving said pick-up means at a speed faster than said normal reproducing speed in a direction and by an amount determined by said comparing step to a second intermediate position which is between an adjacent two of said radially successive second subdivisions located within one of the radially successive first subdivisions between which said pick-up means was last positioned; and repeating the steps of reproducing, comparing and further moving until said pick-up means is moved to said position corresponding to said desired address.

2. A method according to claim 1; in which said step of moving includes the step of first moving said pick-up means to said first intermediate position between said two radially successive first subdivisions at a speed faster than said normal reproducing speed; said step of reproducing includes the step of first reproducing the address signal at said first intermediate position; said step of comparing includes the step of first comparing said address signal reproduced at said first intermediate position with said desired address signal; said step of further moving includes the step of secondly moving said pick-up means at a speed faster than said normal reproducing speed to said second intermediate position between an adjacent two of said radially successive second subdivisions which are within one of said successive first subdivisions in response to said step of first comparing; and said step of repeating includes the steps of secondly reproducing the address signal at said second intermediate position, secondly comparing said address signal reproduced at said second intermediate position with said desired address signal, and thirdly moving said pick-up means at a speed faster than said normal reproducing speed to a third intermediate position between an adjacent two of said radially successive third subdivisions which are within one of said successive second subdivisions between which said pick-up mean was last positioned, in response to said step of secondly comparing.

3. A method of moving pick-up means of an optical reproducing apparatus to a position corresponding to a desired address of a record disk wherein said record disk is rotated at a constant linear velocity with respect to said pick-up means, said record disk having information and address signals recorded in an information area thereon, comprising the steps of:

producing a desired address signal corresponding to said desired address;

generating address signals corresponding to a plurality of radially successive first subdivisions of the information area and radially successive second subdivisions of each of said first subdivisions, in which said radially successive first subdivisions are equal, said radially successive second subdivisions are equal, and each of said second equal radially successive subdivisions is partitioned into third equal radially successive subdivisions;

moving said pick-up means to a first intermediate position between an adjacent two of said radially successive first subdivisions at a speed faster than normal reproducing speed;

reproducing the address signal at said first intermediate position of said pick-up means between said adjacent two first subdivisions;

comparing said address signal reproduced at said first inermediate position with said desired address signal;

further moving said pick-up means at a speed faster than said normal reproducing speed in a direction and by an amount determined by said comparing step to a second intermediate position which is between an adjacent two of said radially smaller successive second subdivisions located within one of the radially successive first subdivisions between which said pick-up means was last positioned; and repeating the steps of reproducing, comparing and further moving until said pick-up means is moved to said position corresponding to said desired address.

4. A method according to claim 3; in which said step of moving includes the first step of successively moving said pick-up means at a speed faster than said normal reproducing speed in a first direction to first positions between successive ones of said first equal radially successive subdivisions; said step of reproducing includes the first step of reproducing the address signal at said successive first positions; said step of comparing includes the step of first comparing said address signal reproduced at said successive first positions with said desired address signal; and step of further moving includes the step of secondly successively moving said pick-up means in a reverse, second direction at a speed faster than said normal reproducing speed, upon determination that the address signal reproduced at one of said first positions is greater than said desired address signal, to second positions between successive adjacent ones of said second equal radially successive subdivisions and within one of the first equal radially successive subdivisions between which said pick-up means was last positioned; and said step of repeating includes the steps of secondly reproducing the address signal at said second positions, comparing said address signal reproduced at said successive second positions with said desired address signal, and thirdly successively moving said pick-up means in said first direction at a speed faster than said normal reproducing speed, upon determination that the address signal reproduced at one of said second positions is less than said desired address signal, to third positions between successive adjacent ones of said third equal radially successive subdivisions and within one of the second equal radially successive subdivisions between which said pick-up means was last positioned.

5. Apparatus for optically reproducing information signals from an information area on a record disk rotated at a constant linear velocity, said information area also including address signals recorded therein, said apparatus comprising:

pick-up means for reproducing said information and address signals from said information area;

drive means for moving said pick-up means in the radial direction of said reocrd disk;

address setting means for producing a desired address signal corresponding to a desired address of said record disk; and processing means for at least generating address signals which partition said information area into two radially equal successive first subdivisions, partition each of said radially successive first subdivisions into two radially successive second subdivisions and partition each of said radially equal successive second subdivisions into two radially equal successive third subdivisions, for controlling said drive means to move said pick-up means at a speed faster than normal reproducing speed to a first intermediate position between an adjacent two of said radially successive first subdivisions, said first intermediate position being defined by one of said address signals, for comparing the address signal reproduced by the pick-up means at said first intermediate position with said desired address signal, and for thereafter controlling the drive means to continuously control the direction and amount of movement of said pick-up means at a speed faster than said normal reproducing speed to successive intermediate positions each between an adjacent two of relatively smaller radially successive subdivisions, each of said successive intermediate positions being within one of the radially successive subdivisions between which said pick-up means was last positioned and being defined by a respective one of said address signals, until said pick-up means is moved to a position corresponding to said desired address.

6. Apparatus according to claim 5; further comprising mirror surface detecting means for detecting when no information is recorded at a position on said record disk and for producing an output signal in response thereto; and in which said processing means controls said drive means to move said pick-up means in response to said output signal.

* * * * *